United States Patent
Bergstrand et al.

(10) Patent No.: US 7,315,396 B2
(45) Date of Patent: Jan. 1, 2008

(54) SYSTEMS AND METHODS FOR GENERATING BANNER PAGES

(75) Inventors: Martha Patricia Bergstrand, Meridian, ID (US); Whitney Tyson, Eagle, ID (US); James Clough, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 986 days.

(21) Appl. No.: 10/464,328

(22) Filed: Jun. 18, 2003

(65) Prior Publication Data

US 2004/0257606 A1 Dec. 23, 2004

(51) Int. Cl.
*H04N 1/40* (2006.01)
(52) U.S. Cl. .................. 358/1.9; 358/1.16
(58) Field of Classification Search ........... 358/1.9, 358/2.1, 1.15–1.18, 468; 715/507–509
See application file for complete search history.

(56) References Cited

U.S. PATENT DOCUMENTS 4,783,760 A * 11/1988 Carosso .................. 715/519
5,043,749 A * 8/1991 Punater et al. ............. 347/130
5,404,294 A * 4/1995 Karnik ..................... 715/507
6,919,967 B1 * 7/2005 Pentecost et al. .......... 358/1.15
2002/0178190 A1 * 11/2002 Pope et al. ................ 707/530

* cited by examiner

*Primary Examiner*—Thomas D. Lee
*Assistant Examiner*—Stephen Brinich (57) ABSTRACT

Disclosed are systems and methods for generating customized banner pages. In one embodiment, a system and a method pertain to creating a banner page document on a word processing application such that the document includes at least one token that is indicative of dynamic information to be added to a printed banner page and that is recognizable by a printing service manager that manages a public printing service, printing the banner page document to file to create a print ready banner page file, and uploading the print ready banner page file to the printing service manager for the purpose of transforming the print ready banner page file by replacing the at least one token with at least one print ready variable that can be used to merge dynamic information with the print ready banner page file at print time.

25 Claims, 6 Drawing Sheets

SYSTEMS AND METHODS FOR GENERATING BANNER PAGES

BACKGROUND

Computer users often carry portable computing devices with them such as notebook computers, personal digital assistants (PDAs), and mobile telephones that include computing capabilities. Such users may at some point wish to print data from the portable computing device while remote from the user's work or home network. For instance, a mobile user may wish to print when at a coffee shop that provides network (e.g., Internet) access and printing services, or when staying at a hotel that comprises a hotel network that includes a public printing device.

In such public printing scenarios, it may be difficult for users, or those who deliver printed documents, to identify their documents once printed by a printing device, particularly in situations in which many different persons are using the printing device and therefore create many different documents. The identification process can be simplified by using banner pages that identify the user that sent each print job. In such a case, the host of the public printing system (e.g., coffee shop, hotel) may wish to customize such banner pages by, for example, placing the name of the host or advertisements/coupons on the banner pages. Although banner page customization can be easily accomplished by experienced programmers, such customization may be more difficult to achieve for less savvy users (including those persons who may administer the public printing system), particularly in view of the fact that the banner pages contain dynamic information such as a user identifier (e.g., user name) and, optionally, other information (e.g., date and time when the hardcopy document was printed).

SUMMARY

Disclosed are systems and methods for generating customized banner pages. In one embodiment, a system and a method pertain to creating a banner page document on a word processing application such that the document includes at least one token that is indicative of dynamic information to be added to a printed banner page and that is recognizable by a printing service manager that manages a public printing service, printing the banner page document to file to create a print ready banner page file, and uploading the print ready banner page file to the printing service manager for the purpose of transforming the print ready banner page file by replacing the at least one token with at least one print ready variable that can be used to merge dynamic information with the print ready banner page file at print time.

In another embodiment, a system and method pertain to receiving a print ready banner page file, identifying a token contained within the file, the token being indicative of dynamic information that is to be contained in a printed banner page, replacing the token with a print ready variable that is used to merge dynamic information at print time, and storing a modified version of the print ready banner page file.

In yet another embodiment, a system and a method pertain to receiving a print request, initiating printing of the print ready banner page file, adding a variable definition to the file that defines the print ready variable, merging dynamic information with the print ready banner page file, and outputting a hardcopy banner page containing the dynamic information.

BRIEF DESCRIPTION OF THE DRAWINGS

The disclosed systems and methods can be better understood with reference to the following drawings. The components in the drawings are not necessarily to scale.

DETAILED DESCRIPTION

Disclosed herein are example embodiments of systems and methods that facilitate public printing. Although particular embodiments are disclosed, these embodiments are provided for purposes of example only to facilitate description of the disclosed systems and methods.

Figure 1:
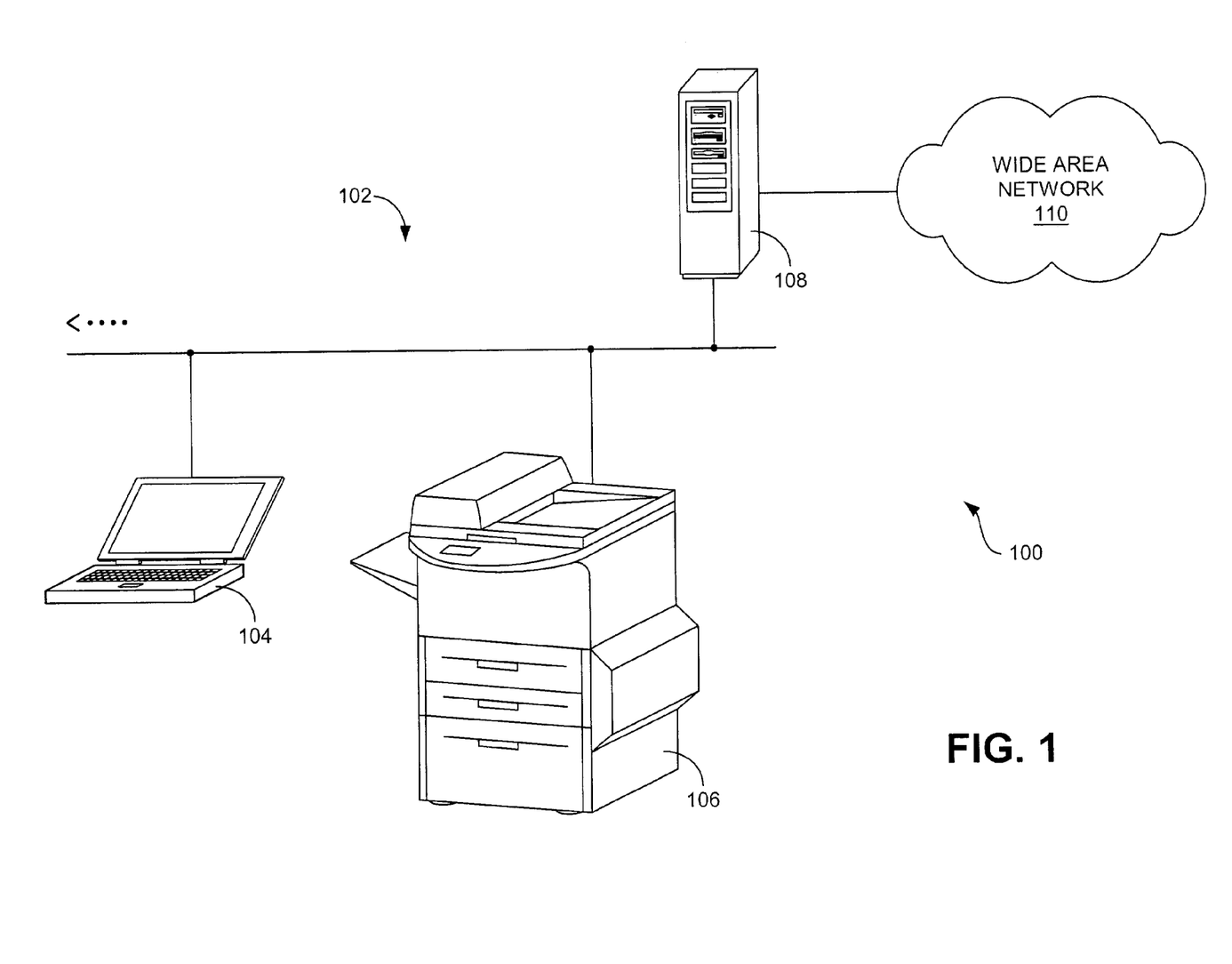
FIG. 1 is a schematic view of an embodiment of a system that facilitates public printing.

Referring now in more detail to the drawings, in which like numerals indicate corresponding parts throughout the several views, FIG. 1 illustrates an example system 100 that facilitates public printing. As indicated in this figure, the system 100 includes a local or internal network 102 to which a computing device 104, a printing device 106, and a server computer 108 are connected. The internal network 102 is assumed to comprise a network that is unfamiliar to the mobile user. By way of example, the internal network 102 comprises a hotel network to which the user can connect from the user's hotel room. Although a hotel network is explicitly identified for purposes of discussion, the internal network 102 more generally comprises any network (wired or wireless) that a mobile user may wish to connect to and print over.

As is depicted in FIG. 1, the computing device 104 can be a notebook (or "laptop") computer. More generally, however, the computing device 104 may comprise any portable computing device that the mobile user may carry from place to place. Accordingly, the computing device 104 can, alternatively, comprise one of a personal digital assistant (PDA), tablet computer, mobile telephone, etc. Irrespective of its configuration, the computing device 104 is connectable to the internal network 102 such that the computing device can communicate with one or both of the printing device 106 and the server computer 108. This connection may comprise either a wired connection or a wireless connection (e.g., via a radio frequency (RF) communication protocol). Stored on the computing device 104 is client software (or firmware) that is used to access and use a public printing service facilitated by a printing service manager.

The printing device 106 comprises any device that can receive print jobs via the internal network 102 and generate hardcopy documents associated with the received jobs. By way of example, the printing device 106 comprises a laser printer. However, other configurations are possible. For instance, the printing device 106 can be a multi-function peripheral (MFP) device that is capable of printing as well as performing other tasks such as copying, scanning, faxing, emailing, etc. As is described in greater detail below, the printing device 106 can comprise an embedded printing service manager that facilitates public printing.

The server computer 108 links the internal network 102 to an external wide area network (WAN) 110, such as the Internet, and therefore acts as a gateway between the internal network and the WAN. As is described below, the server computer 108 is configured to intercept initial communications directed at devices located outside of the internal network 102 (i.e. on the WAN 110). Such interception may be used to, for example, charge users for Internet access and/or offer printing services to the user. In the latter case, the server computer 108 may be configured to provide a link to the printing service manager that is, for instance, embedded in the printing device 106.

In addition to acting as the network gateway, the server computer 108 (or a separate computer if desired) may be used to provide the network address (e.g., Internet protocol (IP) address) of the printing service manager. Furthermore, the server computer 108 may facilitate billing for rendered printing services by, for instance, posting printing charges to a bill (e.g., hotel bill) or forwarding billing information to a credit card processing service connected to the WAN 110. It is noted that, in some embodiments, the printing service manager, or a portion thereof, may exist on the server computer 108 or another device connected to the network 102.

Figure 2:
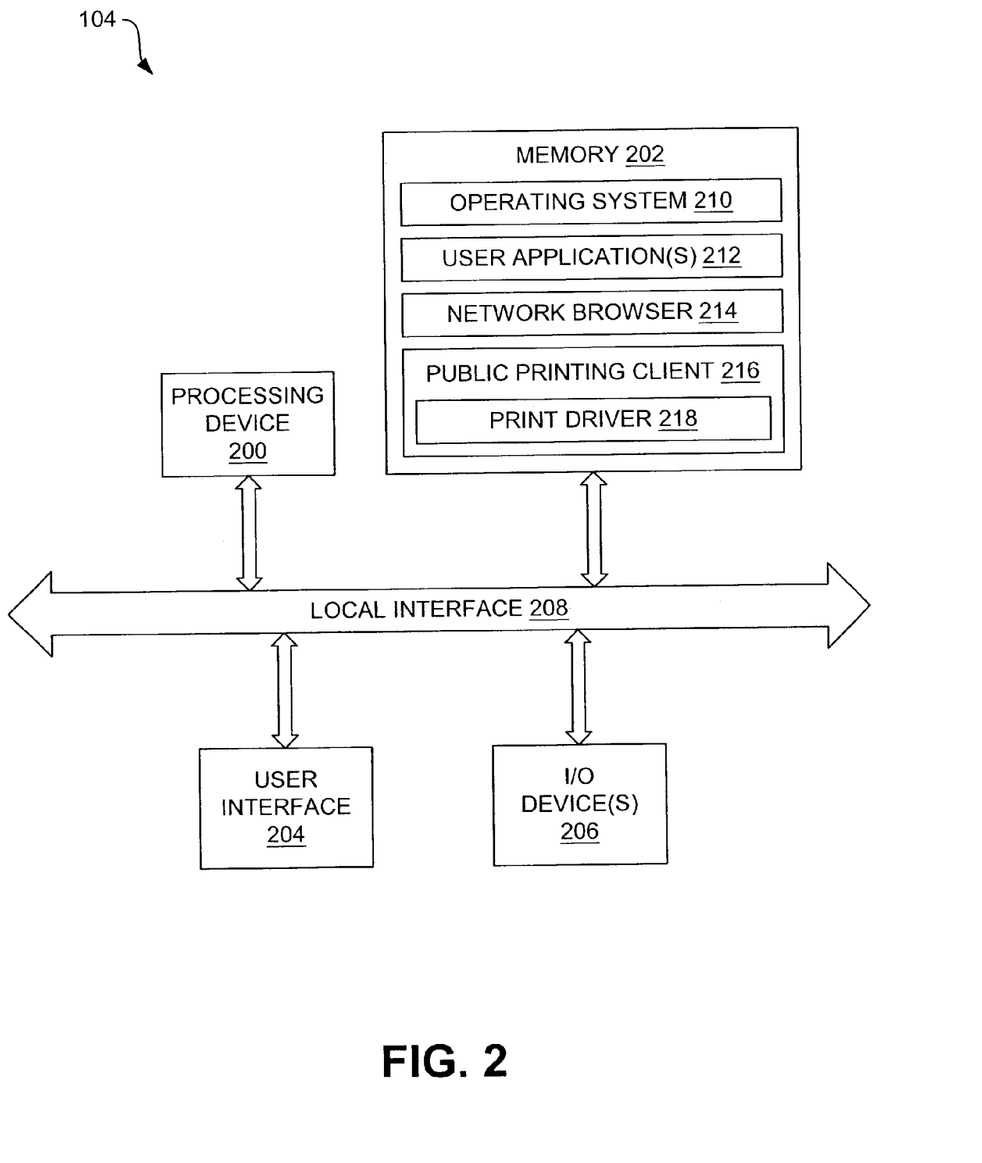
FIG. 2 is a block diagram of an embodiment of a computing device shown in FIG. 1.

FIG. 2 is a block diagram illustrating an example architecture for the computing device 104 shown in FIG. 1. As indicated in FIG. 2, the computing device 104 comprises a processing device 200, memory 202, a user interface 204, and at least one input/output (I/O) device 206. Each of these components is connected to a local interface 208 that, for instance, comprises one or more internal buses.

The processing device 200 is adapted to execute commands stored in memory 202 and can comprise a general-purpose processor, a microprocessor, one or more application-specific integrated circuits (ASICs), a plurality of suitably configured digital logic gates, or other electrical configurations that coordinate the overall operation of the computing device 104. The memory 202 comprises any one or a combination of volatile memory elements (e.g., random access memory (RAM)) and nonvolatile memory elements (e.g., Flash memory, hard disk, etc.) that store or cache data.

The user interface 204 comprises the tools with which user data and commands are input into the computing device 104. In situations in which the computing device 104 comprises a notebook computer, the user interface 204 at least comprises a keyboard and a display. In other embodiments, the user interface may comprise one or more of function keys, buttons, a touch-sensitive display, and a stylus.

The one or more I/O devices 206 facilitate communications with other devices and may include one or more serial, parallel, small computer system interface (SCSI), universal serial bus (USB), or IEEE 1394 (e.g., Firewire™) components, as well as one or more of a modulator/demodulator (e.g., modem), network card, wireless (e.g., RF) transceiver, or other communication component.

The memory 202 includes various programs, in software and/or firmware, including an operating system 210, one or more user applications 212, and a network browser 214. The operating system 210 controls the execution of other software and provides scheduling, input-output control, file and data management, memory management, and communication control and related services. The user applications 212 comprise the programs that may be used to create and/or identify data (e.g., documents) that is to be printed by the service and, more particularly, by the printing device 106. By way of example, these applications comprise one or more of a word processing application, a spreadsheet application, a presentation application, a scheduling application, etc. The network browser 214 comprises a program with which the user can access, via the internal network 102, network sites and pages. By way of example, the network browser 214 is an Internet browser that retrieves Web sites and Web pages. The network browser 214 can be used to access the printing service manager.

In addition to those programs, the memory 202 comprises a public printing client 216. As is described in greater detail below, the public printing client 216 operates in conjunction with the printing service manager to facilitate public printing. By way of example, the public printing client 216 can be downloaded from the printing service manager or from a suitable source on the WAN 110. In any case, however, once stored on the computing device 104, the public printing client 216 can be used to facilitate public printing on any network in which an appropriate printing service manager is provided, thereby providing a substantially universal printing solution.

As is further identified in FIG. 2, the public printing client 216 includes a print driver 218 that is used to translate documents into an appropriate print format. Alternatively, however, the driver 218 could comprise part of the operating system 210. In preferred embodiments, the print driver 218 is a universal driver that can be used in conjunction with substantially any printing device that may be accessed via a compatible printing service manager.

Figure 3:
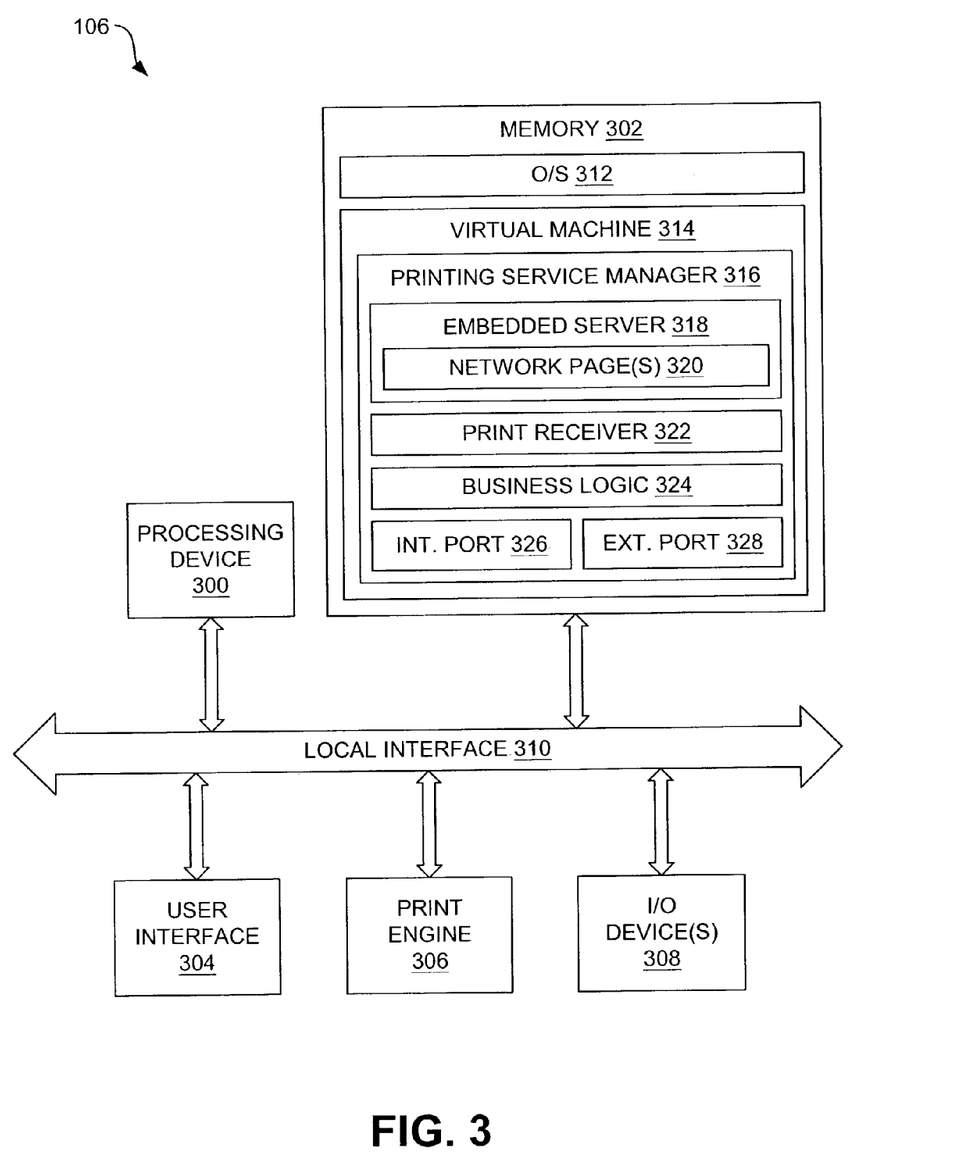
FIG. 3 is a block diagram of an embodiment of a printing device shown in FIG. 1.

FIG. 3 is a block diagram illustrating an example architecture for the printing device 106 shown in FIG. 1. As indicated in FIG. 3, the printing device 106, like the computing device 104, comprises a processing device 300, memory 302, a user interface 304, and at least one I/O device 308, each of which is connected to a local interface 308. In addition, however, the printing device 106 comprises a print engine 306.

The processing device 300, memory 302, and I/O devices 308 have similar configurations to like-named components of the computing device 104 described in relation to FIG. 2. The user interface 304 comprises the components with which users input commands and modify device settings, such as a control panel that incorporates a display (e.g., liquid crystal display (LCD)) and a series of keys or buttons.

The memory 302 comprises various programs, in software and/or firmware, including an operating system 312 and, in this embodiment, a virtual machine 314. The operating system 312 contains the various commands that are used to control the general operation of the printing device 106. The virtual machine 314 is a program that functions as a self-contained operating environment and facilitates operation of a printing service manager 316 that, as noted above, facilitates public printing. Although a virtual machine is explicitly shown and identified, its functionality could, alternatively, be provided by software or firmware stored in the printing device 106. In the embodiment of FIG. 3, however, the manager 316 comprises an applet (e.g., written in the Chai™ programming language of the Hewlett-Packard Company) that includes an embedded server 318, a print receiver 322, and business logic 324. It is noted that, although the printing service manager 316 is shown as executing on the printing device 106, it could alternatively be provided on a separate device, such as the server computer 108 or another device connected to the internal network 102, if desired.

The embedded server 318 is configured to serve network pages 320, for instance Web pages, to requesting devices such as the computing device 104. These pages may contain information for the user as to how to use the public printing system hosted by the printing service manager 316, how to obtain public printing client software, the cost of the printing services, the methods of paying for those services, etc. In addition, other pages may contain information used by a system administrator to generate customized banner pages.

The print receiver 322 is a module that is configured to receive print jobs transmitted to the printing device 106 via the internal network 102. By way of example, the print receiver 322 is specifically configured to receive hypertext transfer protocol (HTTP) and/or secure HTTP (HTTPS) communications. These communications can be received via an internal port 326 and an external port 328 that each has its own network address (e.g., universal resource locator (URL)) that is used to access the port. In some embodiments, the internal port 326 and the external port 328 may comprise the same port. When a print job is received, the print receiver 322 forwards the job to the print engine 306 for printing.

Once printing has been successfully performed, billing (assuming the printing services are provided on a pay basis) is facilitated using the business logic 324. Operation of the business logic 324 depends upon the particular implementation and method of billing that is to be used. By way of example, the business logic 324 is configured to communicate printing charges to the server computer 108 for purposes of posting those charges to a bill (e.g., hotel bill) or contacting an appropriate credit card processing service.

Various programs (i.e. logic) have been described herein. These programs can be stored on any computer-readable medium for use by or in connection with any computer-related system or method. In the context of this document, a "computer-readable medium" is any electronic, magnetic, optical, or other physical device or means that contains or stores a computer program for use by or in connection with a computer-related system or method. These programs can used by or in connection with an instruction execution system, apparatus, or device, such as a computer-based system, processor-containing system, or other system that can fetch the instructions from the instruction execution system, apparatus, or device and execute the instructions.

Figure 4:
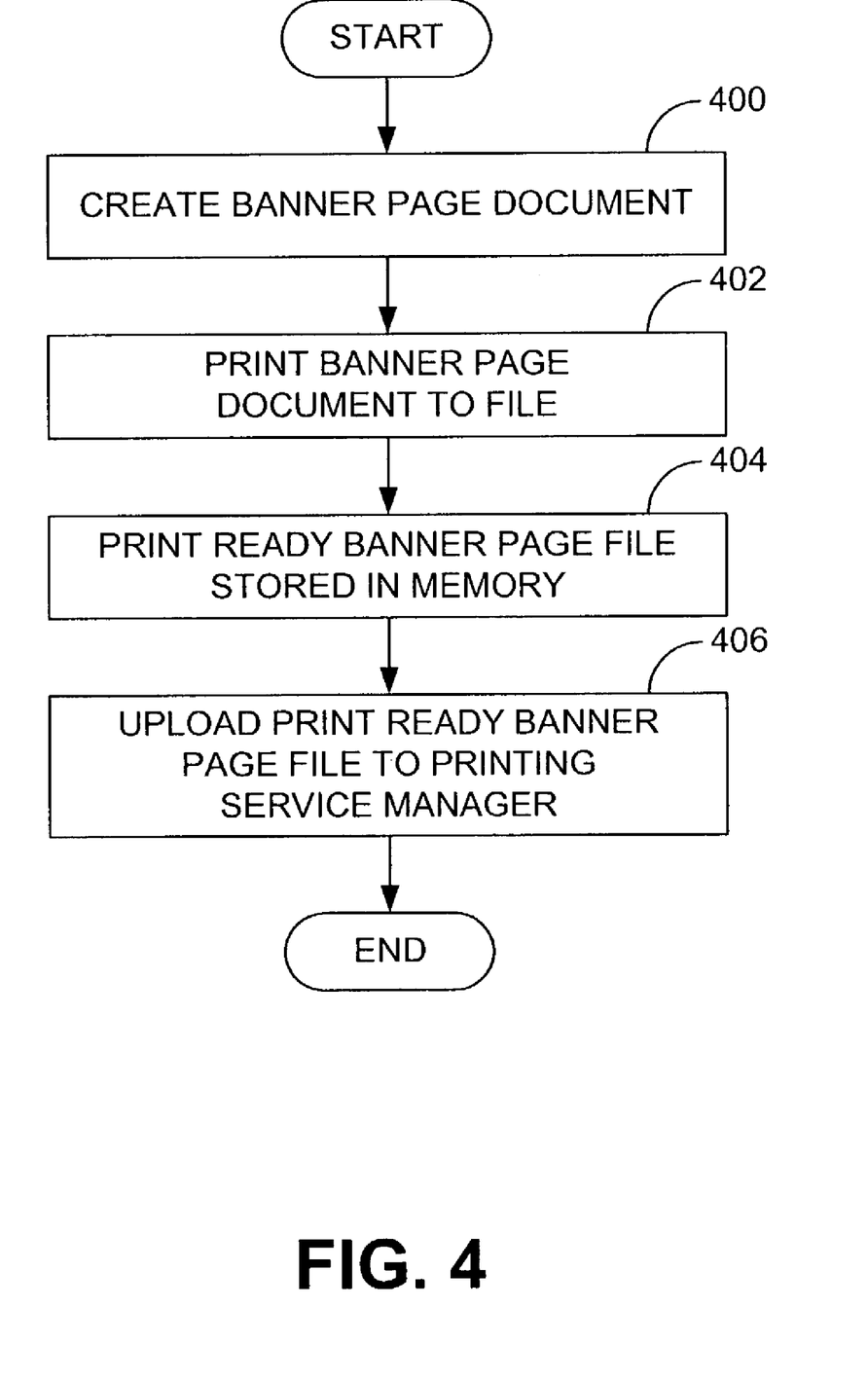
FIG. 4 is a flow diagram of an embodiment of a method for creating a customized banner page.
Figure 5:
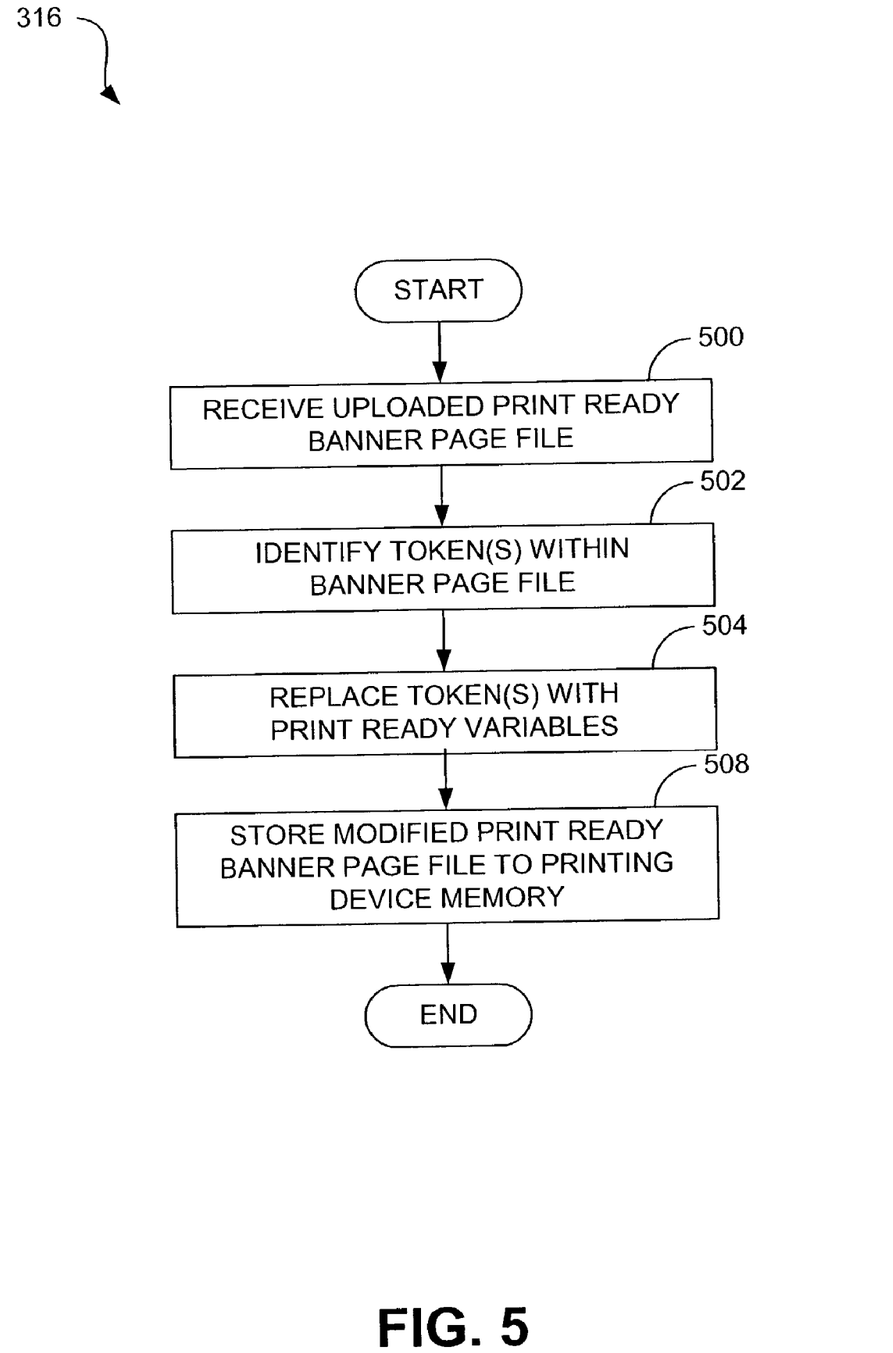
FIG. 5 is a flow diagram of an embodiment of operation of a printing service manager in receiving and modifying a banner page file.
Figure 6:
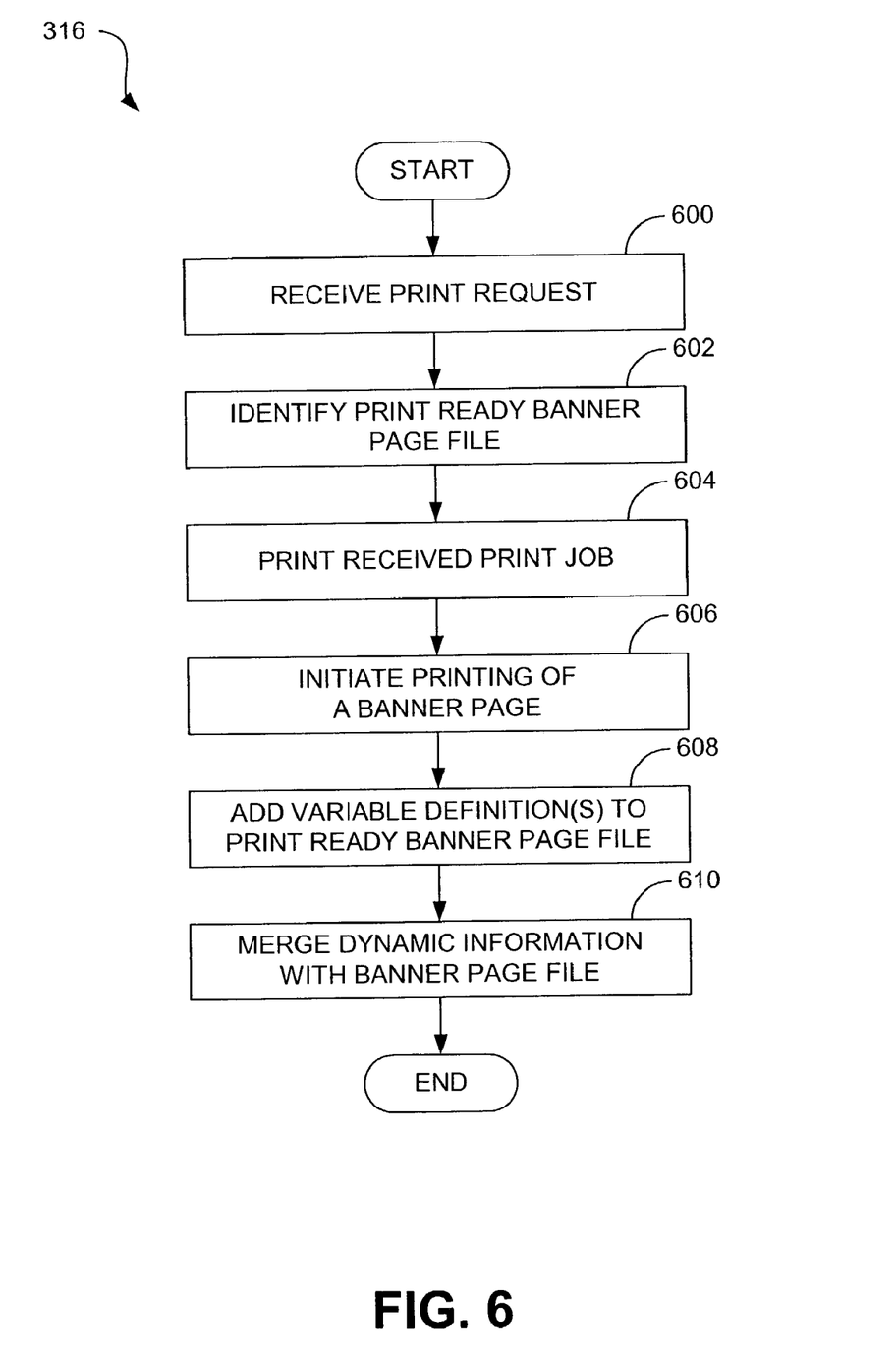
FIG. 6 is a flow diagram of an embodiment of operation of the printing service manager in printing a banner page associated with a print job.

As noted above, it is desirable to provide an easy to use facility for generating customized banner pages in the public printing system. FIGS. 4 and 5 provide flow diagrams that describe an example embodiment of a method for creating such banner pages and FIG. 6 provides an example embodiment of printing a customized banner page after it has been created in the manner described in FIGS. 4 and 5. Process steps or blocks in the flow diagrams of this disclosure may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

FIG. 4 describes an example method for creating and uploading a file that can be used by the printing service manager 316 (FIG. 3) to create suitable print ready banner page data. Beginning with block 400 of FIG. 4, the user, for example a printing system administrator (e.g., hotel staff member), creates a banner page document. By way of example, the banner page document is created in a common word processing application such as Microsoft Word™ or Corel Word Perfect™. By using such an application, the user will most likely be familiar with the application, thereby simplifying the banner page document creation. Presumably, the document is created such that, when printed, the printed banner page will contain both static (i.e. unchanging) information, such as the name of the host (e.g., hotel) that is providing the printing service, and dynamic (i.e. changing) information, such as a user name, a guest room number, a print date, and a print time. However, the banner page document may comprise any information that the user wishes to appear on the printed banner page such as text, graphics, advertisements, or coupons, whether static or dynamic.

Although the user can create the banner page from scratch using the word processing application, the user can, optionally, begin with a banner page document template. Such a template can be obtained, for example, from the printing service manager 316 by browsing to an administrative network (e.g., Web) page hosted by the manager and downloading a default template to the user's computing device on which the application in which the banner page is to be created executes. In such a case, the default banner page document will contain default content that the user can leave unaltered, modify, or replace as desired.

To enable the addition of dynamic information to the printed banner page, one or more tokens may be included in the banner page document. Such tokens are textural indicators that, as is described below, identify dynamic information that is to be added to the banner page at print time. Preferably, the tokens are provided in a format that is easily identifiable by the printing service manager 316, that is unlikely to be intended to be printed literally, and that is easy to understand by the user that is creating the banner page document. To cite an example, the tokens can have a format in which pound (#) signs precede and follow a character that indicates the dynamic information to be added. For instance, the print date can be indicated by "##d##", the print time can be indicated by "##t##", and so forth. Although the pound sign format is explicitly identified herein, any other format that is unlikely to be intended as literal content can be used.

Once the user is satisfied with the content and layout of the banner page, the banner page document is printed to file, as indicated in block 402. By printing the document to file, a print ready banner page file is created by the print driver executing on the user's computing device and is stored to memory (e.g., hard disk), as indicated in block 404. The print ready banner page file may be configured in any format that can be directly printed by a printing device, such as PostScript or printer control language (PCL).

After the print ready banner page file is stored in memory on the user's computing device, it can be uploaded to the printing service manager 316, as indicated in block 406. Such uploading can be achieved by, for example, browsing to another administrative network (e.g., Web) page hosted by the printing service manager 316. In such a case, the user can access an upload page (e.g. using a Web browser), select a "browse" command, browse the user's computing device memory (e.g., hard disk), and select the created print ready banner page file. Once this file is selected, it is transmitted to the printing service manager 316.

Reference is next made to FIG. 5, which provides an example of operation of the printing service manager 316 (FIG. 3) in receiving and modifying the print ready banner page file created using the process illustrated in FIG. 4. Beginning with block 500 of FIG. 5, the uploaded print ready banner page file is received by the printing service manager 316. Once this occurs, the printing service manager 316 identifies the token or tokens contained within the file, as indicated in block 502. This identification is easily accomplished due to the format used to indicate dynamic information, such as the pound sign format described above in relation to FIG. 4. At this point, the identified tokens are replaced with print ready variables, as indicated in block 504. The variables comprise constructs that are recognizable by the print engine 306 of the printing device (FIG. 1) at print time such that the variables may be automatically replaced by the dynamic information they represent as the banner page is printed. For example, when the print ready banner page file is in the PostScript format, the replacement comprises a PostScript macro substitution in which each token is substituted by an appropriate PostScript construct. At this point, the modified print ready banner page file is stored to memory (e.g., hard disk) on the printing device, as indicated in block 506 and the printing service is prepared to print a banner page for each print job sent by a printing service user.

With reference next to FIG. 6, illustrated is an example of printing a banner page at print time. More particularly, illustrated is an example of operation of the printing service manager 316 (FIG. 3) in facilitating printing of a printing job an associated banner page. Beginning with block 600 of FIG. 6, the printing service manager 316 receives a print request, for instance transmitted by the public printing client 216 (FIG. 2). By way of example, this request can have been received via a port (e.g., internal port 326 or external port 328) by the print receiver 322, and may have been contained in initial packets of a print job transmitted by the public printing client 216. Assuming the public printing client 216 is authorized to use the printing service, the public printing manager 316 identifies the print ready banner page file that is to be printed along with the print job being sent to the service for printing, as indicated in block 602.

The printing service manager 316 prints the print job associated with the print request, as indicated in block 604. Once the print job has been printed (or beforehand if a banner page is to be printed before printing of the print job), the printing service manager 316 initiates printing of a banner page. During this time, the print ready banner page file is provided to the print engine 306 for printing. To facilitate recognition of the print ready variables, the printing service manager 316 then adds definitions for the variables to the print ready banner page file, as indicated in block 608, that set the values for each of the variables. By way of example, these definitions are added to the header of the print ready banner page file. Once the definitions have been added to the print ready banner page file, the print ready banner page file is modified and ready for data merging. Specifically, as a consequence of the print ready variables provided in the file during the transformation process described above in relation to FIG. 5, dynamic information is merged with the print ready banner page file during printing, as indicated in block 610, such that the variables are automatically replaced with the information contained in the provided definitions at print time. Accordingly, a hardcopy banner page will be output by the printing device that contains all static and dynamic information that the administrator intended to be provided on the banner page.

Because of the transformation process described above, print speed is increased. Specifically, because of the inclusion of print ready variables and definitions for those variables, dynamic information can be added automatically at print time without having to scan all data contained within the banner page file to identify each token, perform a lookup process for the dynamic information associated with the tokens, and substitute dynamic information for each token. Significantly, such a result is feasible while simultaneously providing an easy to use facility for creating customized banner pages.

What is claimed is:

1. A method for generating a banner page, comprising:
creating a banner page document on a word processing application such that the document includes at least one token comprising a textual indicator that is indicative of dynamic information to be added to a printed banner page and that is recognizable by a printing service manager that manages a public printing service;
printing the banner page document to file to create a print ready banner page file; and
uploading the print ready banner page file to the printing service manager for the purpose of transforming the print ready banner page file by replacing the at least one token with at least one print ready variable that can be used to merge dynamic information with the print ready banner page file at print time.

2. A method for generating a banner page, comprising:
receiving a print ready banner page file;
identifying a token contained within the file, the token being a textual indicator indicative of dynamic information that is to be contained in a printed banner page;
replacing the token with a print ready variable that is used to merge dynamic information at print time; and
storing a modified version of the print ready banner page file.

3. The method of claim 2, wherein receiving a print ready banner page file comprises receiving a PostScript file.

4. The method of claim 2, wherein replacing the token comprises replacing the token using a macro substitution process.

5. The method of claim 2, wherein storing a modified version comprises storing a modified version of the print ready banner page file on a hard disk of a printing device.

6. A method for generating a banner page, comprising:
receiving a print ready banner page file that was created using a word processing application, the file containing a textual indicator that is indicative of dynamic information that is to be contained in a printed banner page;
replacing the textual indicator with a print ready variable that is used to merge dynamic information at print time;
storing into memory a modified print ready banner page file that contains the print ready variable;
receiving a print request;
initiating printing of the print ready banner page file;
adding a variable definition to the file that defines the print ready variable;
merging dynamic information with the print ready banner page file; and
outputting a hardcopy banner page containing the dynamic information.

7. The method of claim 6, wherein storing into memory comprises storing a print ready banner page file in memory of a printing device.

8. The method of claim 7, wherein receiving a print request comprises receiving a print request contained in packets of a print job transmitted from a public printing client.

9. The method of claim 6, wherein adding a variable definition comprises adding a variable definition to a header of the print ready banner page file.

10. The method of claim 9, wherein merging dynamic information comprises replacing print ready variables with the dynamic information during printing using the variable definition contained in the print ready banner page file.

11. A system for generating a banner page, comprising:
means for receiving a print ready banner page file;
means for identifying a token contained within the file, the token being a textual indicator indicative of dynamic information that is to be contained in a printed banner page;
means for replacing the token with a print ready variable that is used to merge dynamic information at print time;
means for storing a modified version of the print ready banner page file;
means for adding a variable definition to the file that defines the print ready variable; and
means for merging dynamic information with the print ready banner page file at print time.

12. The system of claim 11, wherein the means for replacing the token comprise means for performing macro substitution process.

13. The system of claim 11, wherein the means for adding a variable definition comprise means for adding a variable definition to a header of the print ready banner page file.

14. The system of claim 11, wherein the means for storing comprise means for storing a modified version of the print ready banner page file in memory of a printing device.

15. A system for generating banner pages, comprising:
a computing device that is configured to print a banner page document created in a word processing application to file to create a print ready banner page file that contains a token in the form of a textual indicator that is indicative of dynamic information that is to be contained in a printed banner page, the computing device further being configured to upload the print ready banner page file; and
a printing service manager that is configured to receive the print ready banner page file uploaded by the computing device, identify the token contained within the file, replace the token with a print ready variable that is used to merge the dynamic information at print time, and store a modified version of the print ready banner page file.

16. The system of claim 15, wherein the printing service manager is configured to replace the token using a macro substitution process.

17. The system of claim 15, wherein the printing service manager is further configured to add a variable definition to a header of the print ready banner page file that defines the print ready variable.

18. The system of claim 15, wherein the printing service manager is configured to store a modified version of the print ready banner page file in memory of a printing device.

19. The system of claim 15, wherein the printing service manager is further configured to merge dynamic information with the print ready banner page file at print time such that a hardcopy banner page containing the dynamic information is output.

20. A printing service manager stored on a computer-readable medium, comprising:
logic configured to receive a print ready banner page file uploaded from a computing device, the file containing a token in the form of a textual indicator that is indicative of dynamic information that is to be contained in a printed banner page;
logic configured to identify the token contained within the file;
logic configured to replace the token with a print ready variable that is used to merge dynamic information at print time; and
logic configured to store a modified version of the print ready banner page file.

21. The manager of claim 20, wherein the logic configured to replace the token is configured to replace the token using a macro substitution process.

22. The manager of claim 20, further comprising logic configured to add a variable definition to the file that defines the print ready variable.

23. The manager of claim 22, wherein the logic configured to add a variable definition is configured to add a variable definition to a header of the print ready banner page file.

24. The manager of claim 20, wherein the logic configured to store a modified version is configured to store a transformed version of the print ready banner page file in memory of a printing device.

25. The manager of claim 20, further comprising logic configured to merge dynamic information with the print ready banner page file at print time such that a hardcopy banner page containing the dynamic information is output.

* * * * *